(12) United States Patent
Hasebe et al.

(10) Patent No.: US 7,019,470 B2
(45) Date of Patent: Mar. 28, 2006

(54) DISCHARGE LAMP LIGHTING DEVICE

(75) Inventors: Hiroyuki Hasebe, Tokyo (JP); Takashi Ohsawa, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/633,693

(22) Filed: Aug. 5, 2003

(65) Prior Publication Data

US 2004/0080943 A1   Apr. 29, 2004

(30) Foreign Application Priority Data

Aug. 6, 2002  (JP)  ............................ P2002-228532

(51) Int. Cl.
*H05B 37/02*       (2006.01)
(52) U.S. Cl. ........................ 315/308; 315/82
(58) Field of Classification Search ................ 315/276, 315/209 R, 224, 307, 225, 226, 308
See application file for complete search history.

(56) References Cited

U.S. PATENT DOCUMENTS

| 6,437,519 | B1 * | 8/2002 | Ito ............................... 315/291 |
| 6,452,345 | B1 * | 9/2002 | Okura ......................... 315/307 |
| 6,476,568 | B1 * | 11/2002 | Urakabe et al. ............. 315/307 |
| 6,489,732 | B1 * | 12/2002 | Ito et al. ....................... 315/308 |
| 6,617,809 | B1 * | 9/2003 | Ito et al. ....................... 315/312 |
| 6,621,237 | B1 * | 9/2003 | Urakabe et al. ............. 315/276 |
| 2003/0006706 | A1 * | 1/2003 | Yamaguchi et al. ........... 315/82 |
| 2003/0080695 | A1 | 5/2003 | Ohsawa |

FOREIGN PATENT DOCUMENTS

| JP | 2001-143890 A | 5/2001 |
| JP | 2002-159172 A | 5/2002 |

* cited by examiner

*Primary Examiner*—Wilson Lee
*Assistant Examiner*—Minh Dieu A
(74) *Attorney, Agent, or Firm*—Sughrue Mion, PLLC

(57) ABSTRACT

A discharge lamp is supplied with electric power of a negative voltage boosted by a DC/DC converter and electric power of a positive voltage given from a DC source.

3 Claims, 3 Drawing Sheets

DISCHARGE LAMP LIGHTING DEVICE

BACKGROUND OF THE INVENTION

1. Field of the Invention

The present invention relates to a discharge lamp lighting device used for a head lamp of a car, an illuminating lamp in indoor/outdoor facilities, a warehouse and a factory, a streetlamp, etc.

2. Description of the Related Art

Among discharge lamps, high-intensity discharge lamps (HID bulbs) such as a metal halide bulb, a high-pressure sodium bulb, and a mercury bulb have been heretofore used as illuminating lamps in indoor/outdoor facilities, warehouses and factories, streetlamps, etc. because the high-intensity discharge lamps have the advantages of wide light flux, high lamp efficiency, long life, etc. Particularly in recent years, the high-intensity discharge lamps have been used also as head lamps for vehicles such as cars.

To switch on the discharge lamp of this type, starting pulses of a high voltage need to be superposed on a predetermined voltage applied to the bulb at the time of stating the bulb. Therefore, a DC/DC converter and an inverter are provided for lighting the discharge lamp stably while an igniter (starter) is provided for generating starting high-voltage pulses.

FIG. 5 is a circuit diagram of a related-art HID lamp lighting device described in JP-A-2001-143890, etc. FIG. 6 is a time chart for explaining the operation of the related-art HID lamp lighting device.

In FIG. 5, the reference numeral 1 designates a DC source such as a car battery; 2, a discharge lamp lighting device; 3, a DC/DC converter; 4, an inverter made of an H bridge or the like; 5, an igniter; and 6, a discharge lamp. Voltages Va, Vc and Vd shown in FIG. 6 indicate voltages at points a, c and d shown in FIG. 5, respectively.

The polarity of the voltage Va output from the DC/DC converter 3 supplied with a voltage input from the DC source 1 is inverted periodically by the inverter 4, so that rectangular AC voltages represented by the voltages Vc and Vd are applied to the discharge lamp 6. The voltages Vc and Vd applied to the discharge lamp are formed as negative voltages so that the average potentials become negative to prevent devitrification of metal enclosed in the discharge lamp bulb. In the related-art example, all electric power supplied to the discharge lamp is electric power output from the DC/DC converter 3.

FIG. 7 is a circuit diagram for explaining another related-art example described in JP-A-2002-159172.

In FIG. 7, the reference numeral 1 designates a DC source such as a car battery; 3, a DC/DC converter; 7, a transformer; 8, a switching device; 9, a rectifier; 10, a capacitor; and 11, a load circuit (discharge lamp).

In the related-art example, the capacitor 10 has no function but a smoothing function. Accordingly, the capacitor 10 is incapable of supplying a DC current to the load circuit steadily, so that a current I10 does not flow at all. Accordingly, the DC/DC converter 3 provides all the output current I0 from a current It. For this reason, the voltage V1 of the DC source 1 is not superposed on the voltage V10 of the capacitor 10, so that only the voltage generated in the transformer 7 is applied to the load circuit.

In the related-art discharge lamp lighting device, all electric power supplied to the discharge lamp is electric power output from the DC/DC converter. Accordingly, the output capacity of the DC/DC converter needs to be designed according to electric power required for switching on the discharge lamp. Particularly in a car discharge lamp lighting device requiring high electric power at the initial stage of lighting, there was a problem that it was impossible to reduce the size of the DC/DC converter, especially it was impossible to reduce the size of the transformer in the DC/DC converter.

SUMMARY OF THE INVENTION

An object of the invention is to provide a discharge lamp lighting device in which reduction in size and cost of a DC/DC converter can be attained.

In the discharge lamp lighting device according to the invention, the discharge lamp is supplied with electric power of a negative voltage boosted by a DC/DC converter and electric power of a positive voltage given from a DC source.

Electric power of a positive voltage is given from the DC source through a voltage drop circuit.

The voltage drop circuit includes an inverter.

BRIEF DESCRIPTION OF THE DRAWINGS

These and other objects and advantages of this invention will become more fully apparent from the following detailed description taken with the accompanying drawings in which.

DETAILED DESCRIPTION OF THE PREFERRED EMBODIMENTS

Now, a description will be given in more detail of preferred embodiments of the present invention with reference to the accompanying drawings.

Embodiment 1

An embodiment of the invention will be described below.

Figure 1:
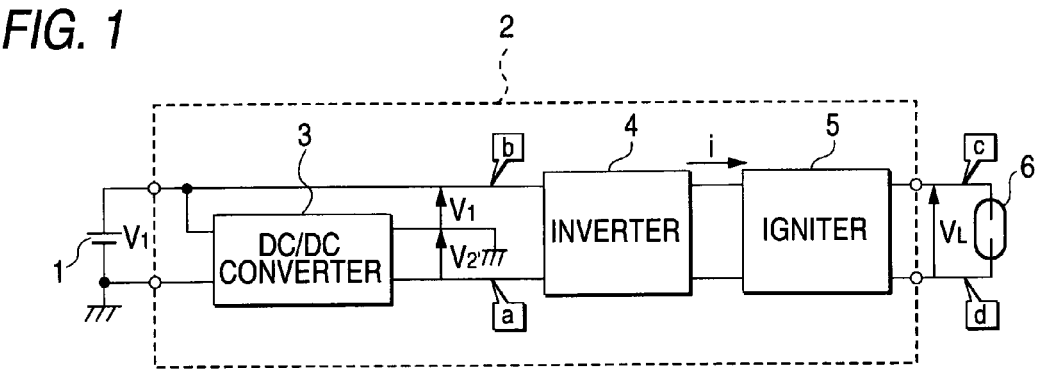
FIG. 1 is a circuit diagram showing Embodiment 1 of the invention.

FIG. 1 is a circuit diagram showing Embodiment 1. In FIG. 1, the reference numeral 1 designates a DC source such as a car battery; 2, a discharge lamp lighting device; 3, a DC/DC converter (boosting circuit); 4, an inverter (DC-AC conversion circuit); 5, an igniter (lighting starter circuit); and 6, a discharge lamp. Voltages Va, Vb, Vc and Vd shown in FIG. 2 indicate voltages at points a, b, c and d shown in FIG. 1, respectively.

The DC/DC converter 3 is provided for converting a source voltage of the DC source 1 into a desired DC voltage. The same DC/DC converter as in the related-art example 1 or 2 may be used as the DC/DC converter 3.

Figure 2:
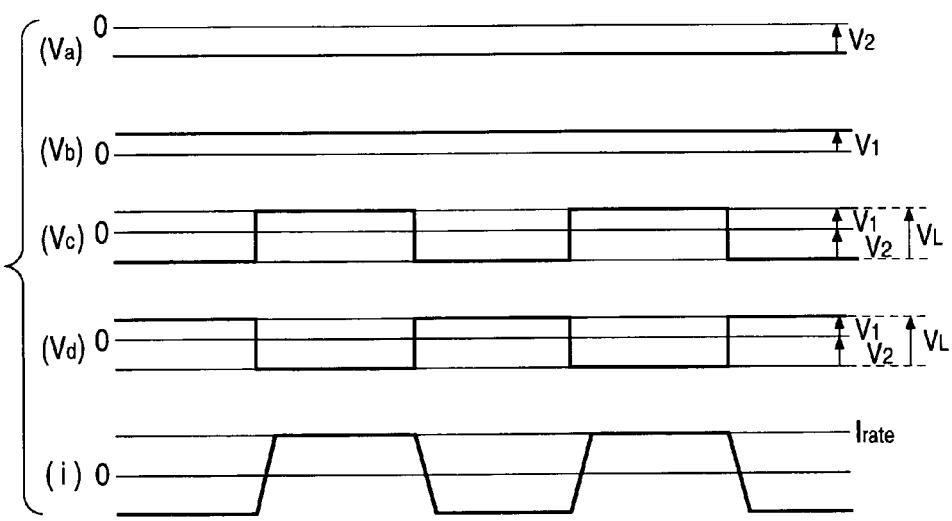
FIG. 2 is a time chart for explaining the operation of Embodiment 1 of the invention.

The operation of the circuit shown in FIG. 1 will be described with reference to FIG. 2 which is a time chart for explaining the operation.

A negative voltage V2 output from the DC/DC converter 3 and a positive voltage V1 of the DC source 1 are input to the inverter 4. The inverter 4 inverts the polarity of the sum Ve of the two voltages and applies voltages Vc and Vd to the discharge lamp 6. As a result, the discharge lamp 6 is lighted continuously by a potential difference VL. Incidentally, because the voltage VL is a voltage between positive and negative potentials, it is difficult to obtain a desired potential if the inverter 4, the igniter 5 or the discharge lamp 6 is grounded. It is therefore preferable that the inverter 4, the igniter 5 or the discharge lamp 6 is not grounded.

As described above, a part of electric power P0 supplied to the discharge lamp 6 and occupied by the output voltage V2 of the DC/DC converter 3 in the discharge lamp voltage VL is electric power output from the DC/DC converter 3. The residual part of electric power P0 occupied by the voltage V1 of the DC source 1 in the discharge lamp voltage VL is electric power that can be supplied from the DC source to the discharge lamp 6 directly without interposition of the DC/DC converter 3.

The invention aims at reducing the electric power output from the DC/DC converter 3 without reduction of the voltage supplied to the discharge lamp 6. That is, the invention aims at using a DC/DC converter with a low electric power capacity as the DC/DC converter 3.

The DC/DC converter is designed to have such an electric power capacity that high electric power can be output at the initial stage of lighting the discharge lamp in which electric power output from the DC/DC converter becomes the highest. In this embodiment, the discharge lamp voltage VL is low at the initial stage of lighting the discharge lamp, so that the rate occupied by the voltage V1 of the DC source 1 in the discharge lamp voltage VL increases. As a result, the rate of electric power without interposition of the DC/DC converter 3 to electric power P0 supplied to the discharge lamp 6 increases. Accordingly, electric power output from the DC/DC converter 3 in this period is reduced greatly compared with the related-art case, so that the electric power capacity of the DC/DC converter 3 can be reduced. Accordingly, the sizes of a transformer, a switching device, a rectifier and a capacitor which are constituent members of the DC/DC converter 3 can be reduced. Or inexpensive parts low in rated values can be used.

Embodiment 2

Figure 3:
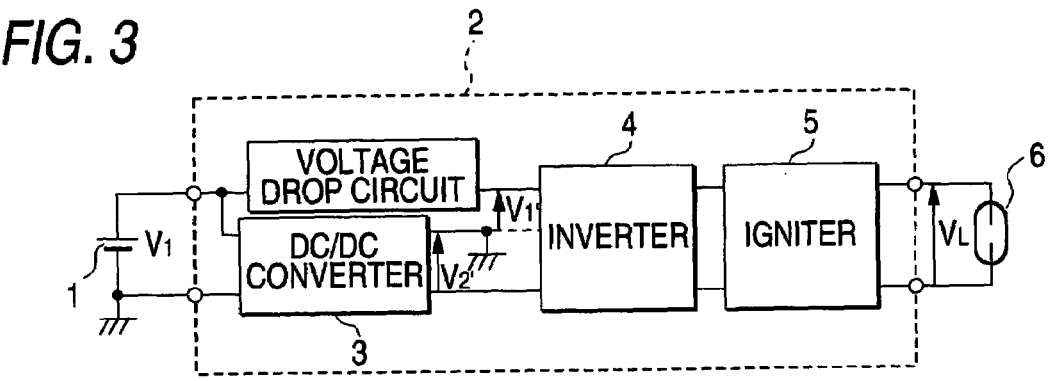
FIG. 3 is a circuit diagram showing Embodiment 2 of the invention.

FIG. 3 shows the case where a negative voltage V2 output from the DC/DC converter 3 and a voltage obtained by dropping a positive voltage V1 of the DC source 1 are superposed on each other. As a result, the discharge lamp can be operated even in the case where the discharge lamp voltage is lower than the positive voltage V1 of the DC source 1. When, for example, the voltage of the DC source is 42 V, the voltage of the discharge lamp is apt to be lower than the voltage of the DC source. Accordingly, the effect due to the provision of the voltage drop circuit is large.

Embodiment 3

Figure 4:
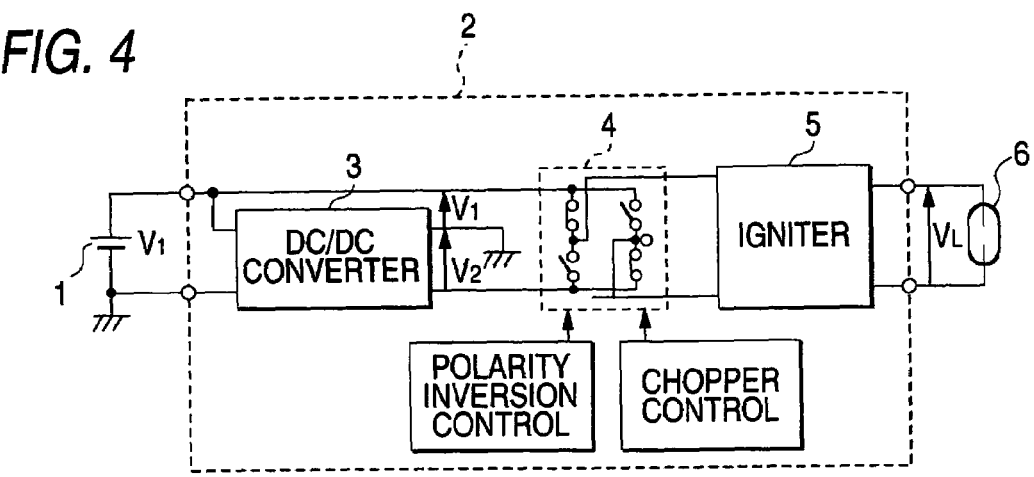
FIG. 4 is a circuit diagram showing Embodiment 3 of the invention.
Figure 5:
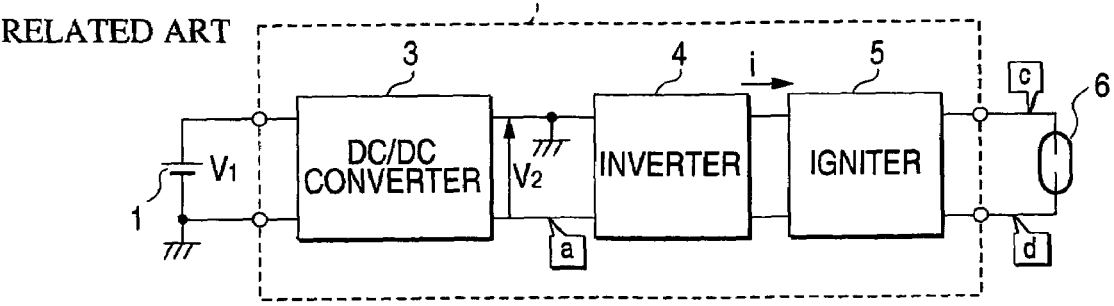
FIG. 5 is a circuit diagram showing a related-art example.
Figure 6:
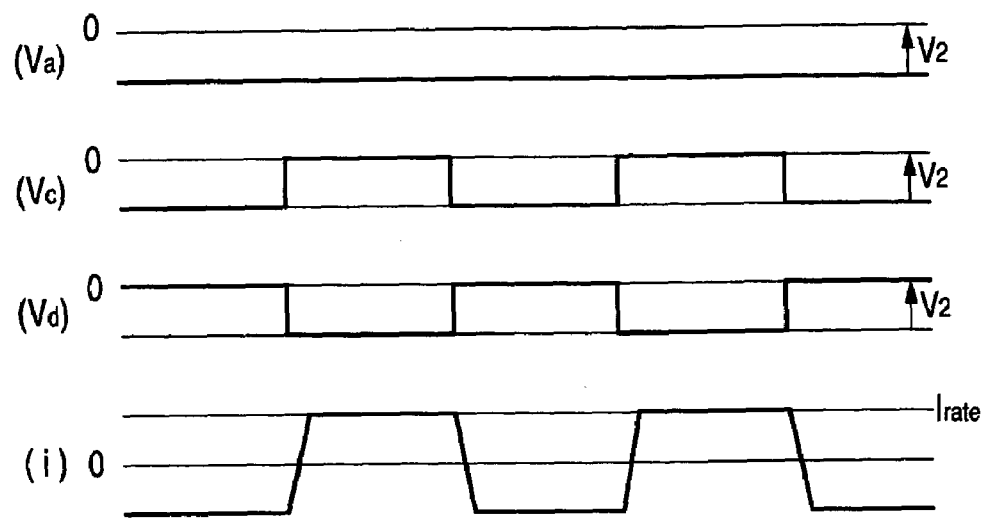
FIG. 6 is a time chart for explaining the operation of the related-art example.
Figure 7:
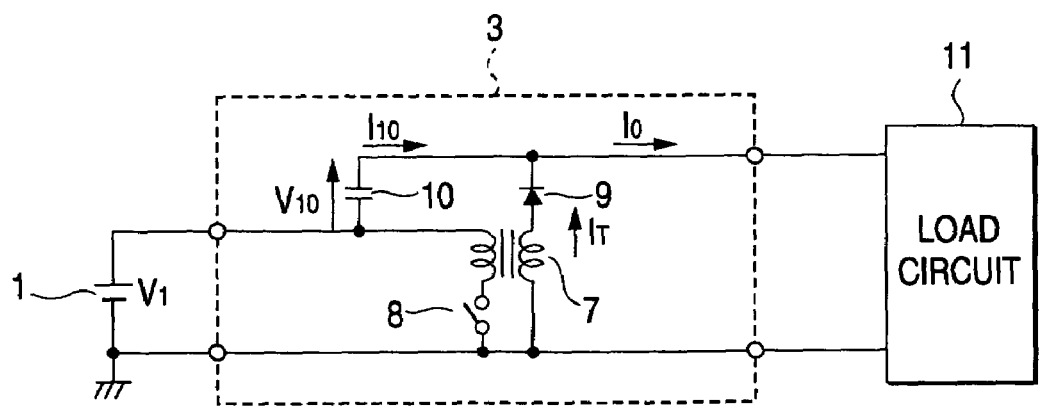
FIG. 7 is a circuit diagram showing another related-art example.

FIG. 4 shows the case where a chopper function is given to the inverter 4 so that the output voltage can be dropped. As a result, the discharge lamp can be operated by the application of the inverter even in the case where the discharge lamp voltage is lower than the positive voltage V1 of the DC source 1.

In the discharge lamp lighting device according to the invention, the discharge lamp is supplied with electric power of a negative voltage boosted by the DC/DC converter and electric power of a positive voltage given from the DC source, so that the electric power capacity of the DC/DC converter can be reduced.

Furthermore, because electric power of a positive voltage can be given from the DC source through the voltage drop circuit, the discharge lamp can be lighted stably even in the case where the voltage of the discharge lamp is lower than the voltage of the DC source.

Furthermore, because the voltage drop circuit can be formed by using an inverter, the discharge lamp can be lighted stably in spite of simple configuration even in the case where the voltage of the discharge lamp is lower than the voltage of the DC source.

The foregoing description of the preferred embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. A discharge lamp lighting device comprising:
   a DC/DC converter for boosting electric power given from a DC source;
   an inverter; and
   an igniter,
   wherein said inverter inverts the polarity of a sum of a negative voltage boosted by said DC/DC converter and a positive voltage given from said DC source to generate an AC wave, and
   wherein said igniter receives said AC wave and supplies a high voltage to said discharge lamp at a time of switching on said discharge lamp.

2. The discharge lamp lighting device according to claim 1, further comprising a voltage drop circuit through which electric power of a positive voltage is given from said DC source.

3. The discharge lamp lighting device according to claim 2, wherein said voltage drop circuit includes an inverter.

* * * * *